R. E. WALKER.
CONVERTIBLE RAILWAY CAR.
APPLICATION FILED AUG. 23, 1919.
1,344,322.
Patented June 22, 1920.
2 SHEETS—SHEET 1.
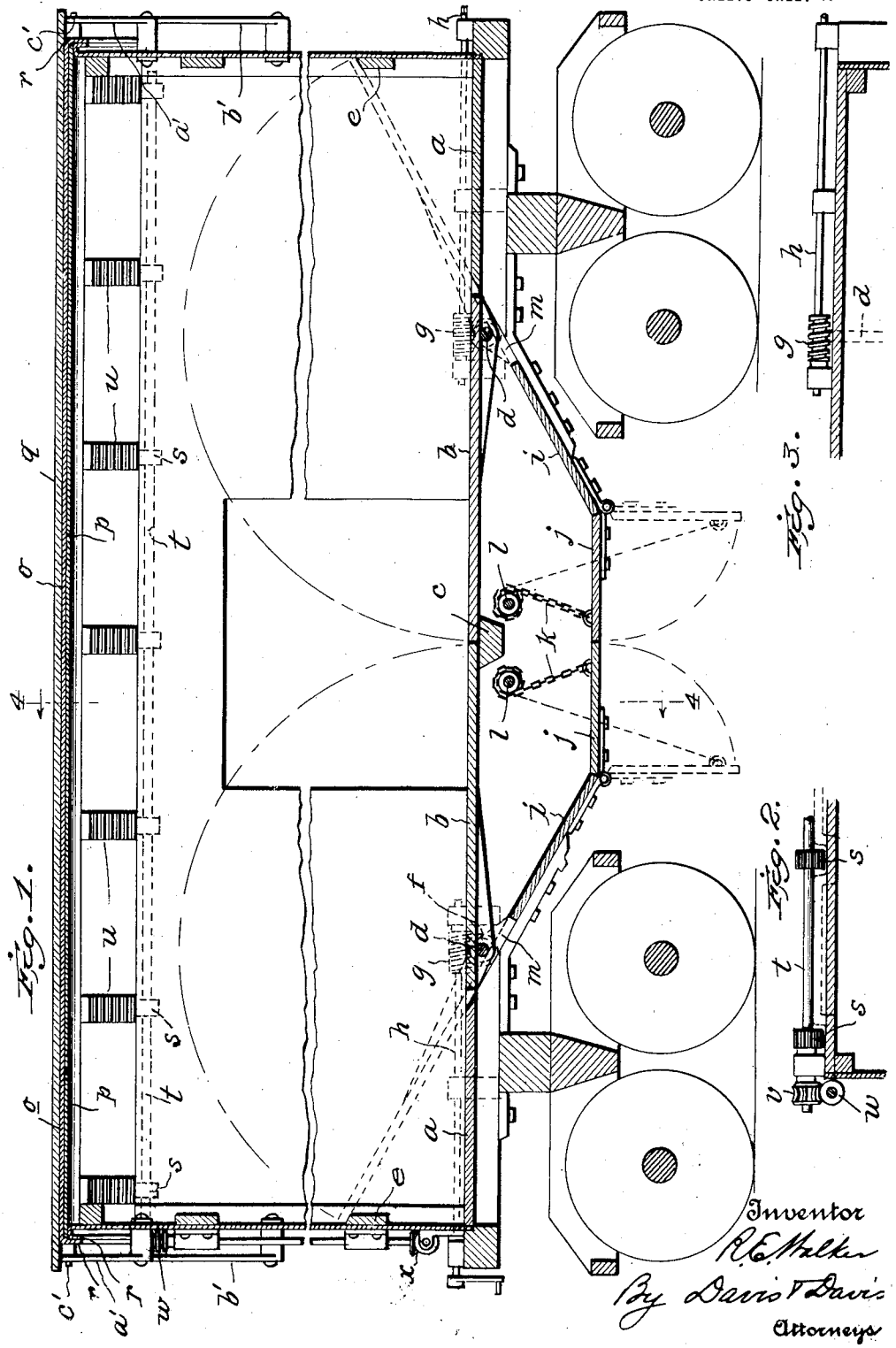

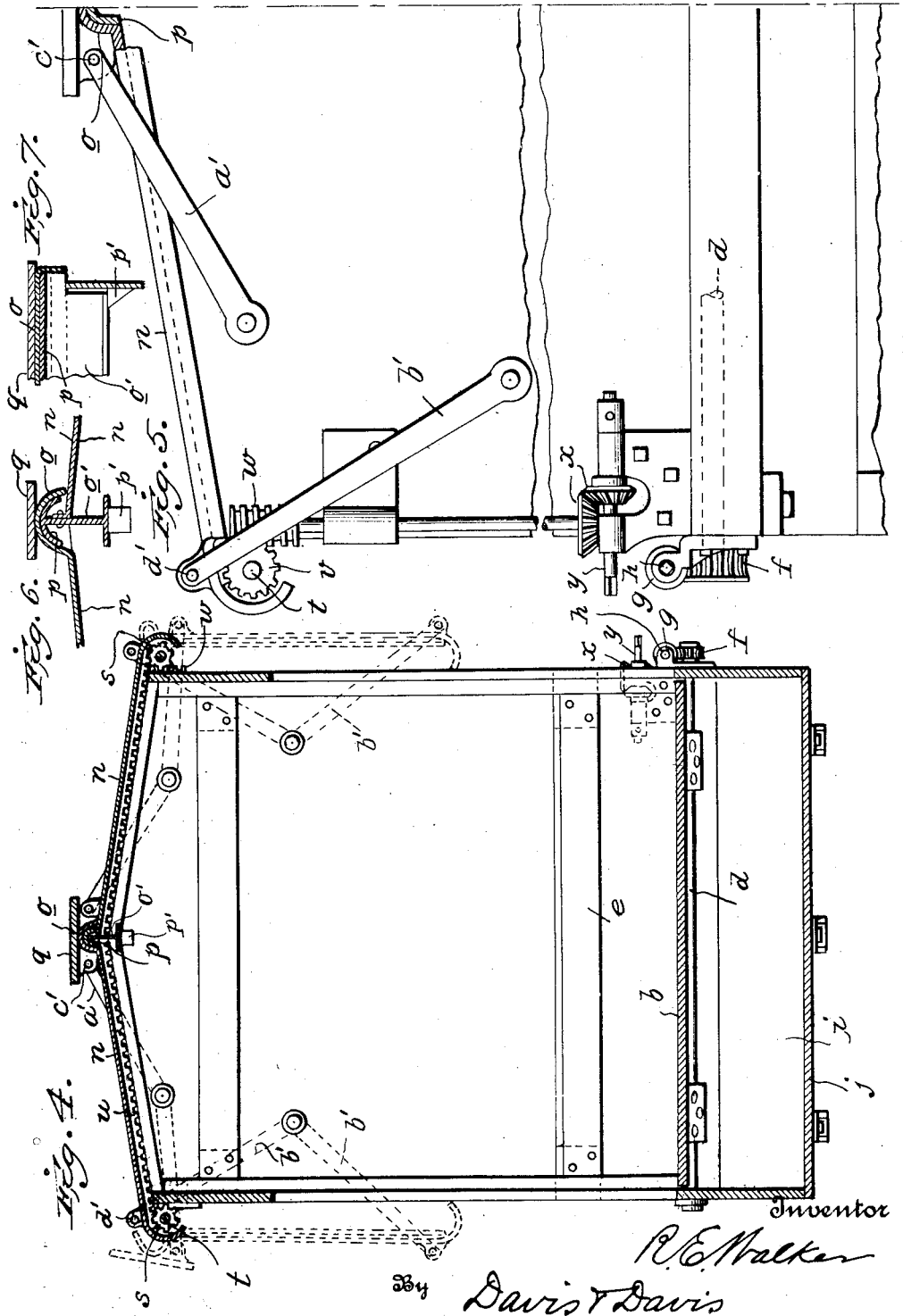

UNITED STATES PATENT OFFICE.

RICHARD E. WALKER, OF ROANOKE, VIRGINIA.

CONVERTIBLE RAILWAY-CAR.

1,344,322.  Specification of Letters Patent.  Patented June 22, 1920.

Application filed August 23, 1919. Serial No. 319,393.

*To all whom it may concern:*

Be it known that I, RICHARD E. WALKER, a citizen of the United States of America, and a resident of Roanoke, county of Roanoke, and State of Virginia, have invented certain new and useful Improvements in Convertible Railway - Cars, of which the following is a full and clear specification.

The object of this invention is to so construct a railway car that it may be readily converted from a car of the box type, i. e., a car having a closed roof-structure and a flat closed bottom, into a car of the gondola type, i. e., a car having an open top and a flat closed bottom; into a car of the open hopper type, i. e., a car having an open top and a double inclined bottom leading to a center dump-chute; or into a car of the closed hopper type, i. e., a car having a closed roof-structure and a double inclined bottom leading to a center dump-chute, as more fully hereinafter set forth.

In the drawings—

Figure 1 is a vertical longitudinal sectional view showing a car for use as a box car;

Figs. 2 and 3 are views of details hereinafter described;

Fig. 4 is a transverse vertical sectional view on the line 4—4 of Fig. 1;

Fig. 5 is a partial end view of the car as adjusted in Fig. 4;

Figs. 6 and 7 are sectional views of details of the overlapping edges of the roof-sections.

Referring to the drawings annexed by reference-characters, *a* designates the two permanent floor-sections, one arranged at each end of the car, and *b* two adjustable floor-sections each extending from one of said permanent sections to the transverse center of the car, these sections serving to complete the floor of the car and being flush with the permanent sections *a* when the car is adjusted for use as a box car. The inner ends of adjustable sections *b* rest on a transverse beam *c* at the center of the car, and near their outer ends they are each affixed to a rockable shaft *d* suitably journaled in the floor-beams of the car and located under the floor-section *b* and a short distance from its outer end. Each of these sections *b* may be swung upwardly and outwardly toward the end of the car by rock-shaft *d*, and when thus swung over as far as they will go their outer ends rest upon transverse battens *e* affixed to the end-walls of the car, as shown in dotted lines in Fig. 1. This rocking of the shaft *d* is accomplished through the medium of a worm-gear *f* affixed to shaft *d* and engaged by a worm *g* mounted on the shaft *h* journaled in suitable bearings in the side of the car, said shaft being squared at one end to permit it to be turned by the application of a crank-wrench.

The usual center dump-chute is provided underneath the adjustable section *b*, this chute consisting of the two oppositely-inclined bottom sections *i* and the two central dump-doors *j*, which latter are adapted to be opened and closed in any suitable manner, desirably by chains *k* and transverse shafts *l*. The inclined bottom-sections *i* do not extend entirely to the inner edges of the permanent sections *a*, but terminate short thereof, leaving a transverse space *m*, which space is closed by the outer end of the swinging section *b* when the same is inverted into the dotted-line position, so that in this inverted position the adjustable section *b* forms virtually a continuation of the permanent chute section *i*, so that each inclined wall of the chute extends continuously from the dump-doors *j* upwardly to the end-wall of the car.

The roof-structure consists of two sections *n* which extend the entire length of the car. To the inner edge of one of these sections is affixed the vertical web of an I-beam *o'*, the top-plate or flange *p* of which is curved downwardly on either side of the upright web and has fitted over it an upraised bead *o* formed on the inner edge of the other section *n* so as to form a weatherproof joint when the roof is closed. The I-beam *o'*, with the exception of the curved top-flange *o* and that part of the upright web of the beam extending above the lower side of roof-section *n*, is made short enough to drop down into the car when the roof is closed. The ends of the lower part of the I-beam rest upon bracket-supports *p'* affixed to the ends of the car; the upper part of the I-beam extends over and rests upon the ends of the car along with the entire end of the roof-section. This I-beam gives rigid support to the roof-center the entire length of the car. The ends of the bead *o* overlapping the downwardly-curved flange or strip *p* of the I-beam are closed down over the ends of the I-beam so as to afford a weather-proof joint, as shown in Fig. 7;

also the ends of the roof-section n are bent downwardly over the ends of the car, which are beaded outwardly, and afford a weatherproof joint for the entire car-end, as shown in Fig. 1. The running-board q is affixed to the bead o. The outer longitudinal edge of each roof-section n rests upon a series of pinions s affixed to a longitudinal shaft t journaled in suitable bearings outside of the car-wall, adjacent the top-edge thereof. For each pinion s, the roof-section is provided with a rack-bar u extending transversely of the roof-section, from its outer edge to its inner edge. The shaft t is adapted to be rotated manually by any suitable means, preferably through a worm-gear arrangement such as shown for operating the adjustable floor-sections b. The mechanism consists of a worm-gear v affixed to one end of the shaft t, a worm w meshing therewith and affixed to a vertical shaft suitably journaled on the end-wall of the car. A pair of bevel-gears x are arranged to rotate this vertical shaft, one of these gears being mounted on a counter-shaft y which is adapted to be driven by a suitable crank-wrench or otherwise. The mechanism driving one of the shafts t is placed at one end of the car and that driving the other is located at the other end of the car with counter-shafts y so placed as to enable both mechanisms to be operated from the same side of the car as that on which the invertible bottom-sections b are manipulated.

Each of the roof-sections n is connected at each end to the adjacent end-wall of the car by means of a pair of links a' and b', the links a' being pivotally connected at their upper inner ends (at c') to the roof-section near its inner edge, so that when the roof-section is closed the links a' will incline downwardly and outwardly toward the side-wall of the car. The other links b' are pivotally connected at d' to the outer edges of the roof-sections, from which points the links b' incline downwardly and inwardly toward the floor of the car when the roof-sections are in closed position. When the roof-sections are to be adjusted to open the top of the car, the rock-shafts t are rotated so as to move the roof-sections outwardly, i. e., away from the center of the car. As the roof-section moves outwardly, its inner edge is caused to swing upwardly by means of the links a', while its outer longitudinal edge is caused to swing outwardly and downwardly by the companion links b', so that the roof-section moves in a curvilinear path from its closed position to its full open position, in which latter position the roof-section stands vertically alongside the outer face of the side-wall of the car, the links a' extending approximately horizontal and the links b' extending upwardly and away from the longitudinal center line of the car, as shown in dotted lines in Fig. 4. It will be understood that the roof-section, during the opening as well as the closing movement thereof, is always in locking engagement with the pinions s so that it is constantly under the perfect control of the operator, this control being further insured by use of the worm-gear, a self-locking mechanism which prevents the roof-section at any point in its adjustment from getting out of the control of the operator, thereby contributing to ease as well as safety in manipulating the roof-section. It will be understood also that in view of the fact that the roof-sections overlie at their inner edges, it will be necessary in opening the car-roof to first shift the roof-section carrying the overlapping bead o before the other can be shifted; and, reversely, in closing the roof, the roof-section having the I-beam o' attached to its inner edge will first have to be adjusted into closed position before the other roof-section is brought to closed position.

It will be observed that the outer edge of each of the roof-sections n is curved downwardly around the pinions to form a housing for the shaft and pinions and also a weather-strip-protected joint between the roof-section and the top-edge of the side-wall of the car.

No method of locking the roof-sections down when the roof is closed is deemed necessary, as their weight will keep them down and the beads lapping over the ends of the car will keep the sections from shifting; also, no method of locking the roof-sections to the sides of the car is deemed necessary, as their weight will keep them down securely.

It will be understood that the depending outer edge of each of the roof-sections forms in addition to a housing for the shaft and pinion an effective weather-strip for the joint between the roof-section and the top edge of the side-wall of the car.

The convertible flat and hopper bottom construction being shown and described but not claimed is made the subject matter of and claimed in my co-pending application Serial No. 353,674, filed Jan. 24, 1920.

The nature and scope of the invention having been thus indicated and its preferred embodiment having been specifically described, what is claimed as new is:

1. In a railway car, a removable roof-structure embodying a pair of longitudinally-extending roof-sections having overlapping members at their inner edges and one of the sections carrying the running-board, and mechanism for swinging the roof-sections outwardly and downwardly to positions at the sides of the car, said mechanism consisting of a plurality of racks on each roof-section, a shaft journaled in each side of the car below the top edge of the side wall of the car and outside of said side wall, each of said shafts being provided with pinions engaging the said racks.

2. In a railway car, a removable roof-structure embodying a pair of roof-sections having overlapping upwardly-beaded edges along their inner edges, and means for moving these sections outwardly and downwardly to positions outside of the walls of the car, each of said beads extending the length of the roof-section and being upwardly convexed so that the beads fit closely one within the other.

3. In a railway car, a removable roof-structure embodying a pair of roof-sections meeting at their inner edges, and means for moving these sections outwardly and downwardly embodying racks and pinions and also a plurality of links for causing the sections to respectively move in a curvilinear path to their places of rest at the sides of the car.

4. In a railway car, a removable roof-structure embodying a pair of roof-sections meeting at their inner edges, means for moving these sections outwardly and downwardly embodying racks and pinions and also a plurality of links for causing the sections to respectively move in a curvilinear path to their places of rest at the sides of the car, and self-locking gearing for manipulating said racks and pinions.

5. In a railway car, a removable roof-structure embodying a pair of roof-sections each being provided with a plurality of rack-bars arranged transversely at its under side, longitudinal shafts provided with pinions for engaging said rack-bars, means for operating said shafts, and means for holding the roof-sections in engagement with the pinions during their movements.

6. In a railway car, a removable roof structure embodying a pair of roof-sections each provided with a plurality of transverse rack-bars on its under side, a longitudinal shaft arranged at each side of the car outside the wall thereof and below the top of the wall, said shaft being provided with pinions engaging said racks, means for rotating said shafts, and links connecting each roof-section to the car and so positioned and proportioned as to permit the roof-sections to shift from a position on top of the car to a vertical position at the side of the car and oscillate on said shaft during movement from one position to the other so as to thereby maintain the pinions in engagement with the rack-bars throughout said movement.

7. In a railway car, a pair of roof-sections and means for swinging them bodily outwardly and downwardly to uncover the top of the car, said means embodying a rock-shaft outside of the top-edge of each side-wall provided with a plurality of pinions for actuating the roof-section, each of said roof-sections carrying racks and also at its outer edge beyond said racks being provided with a depending portion turned inwardly forming with the sides of the car a housing for the shaft and pinions.

8. In combination with a car-body whose end-walls are beaded outwardly at their upper ends, a pair of roof-sections and means for shifting them to uncover the top of the car, said roof-sections being provided at their ends with flanges depending adjacent to said outwardly-turned beads on the end-wall of the car to thereby form weather-proof joints.

9. In combination with a railway car, a pair of roof-sections, means for swinging them to open position, means for stiffening the roof-structure along the longitudinal center of the car and at the same time form a weather-proof joint at the meeting edges of the roof-sections, said means embodying an I-beam affixed to one of the roof-sections having its upper flange bent downwardly to form a bead, and an outer bead formed on the inner edge of the other roof-section, said beads being curved to fit one within the other.

10. In combination with a railway car, a pair of outwardly-moving roof-sections and means adapted to connect the inner edges thereof, said means consisting of interfitting beads running longitudinally of the roof-structure, one of said beads being formed on one roof-section and the other on a beam attached to the other section, the ends of said beam being adapted to rest on the end-walls of the car.

In testimony whereof I hereunto affix my signature.

RICHARD E. WALKER.